United States Patent [19]
Price

[11] 4,179,939
[45] Dec. 25, 1979

[54] DIESEL FUEL PIPE TRANSDUCER

[75] Inventor: Ronald Price, Hazeldean, Canada

[73] Assignee: Goodwood Data Systems Ltd., Ontario, Canada

[21] Appl. No.: 936,800

[22] Filed: Aug. 25, 1978

[30] Foreign Application Priority Data

Nov. 10, 1977 [CA] Canada ............................... 290636

[51] Int. Cl.$^2$ ............................................. G01L 7/02
[52] U.S. Cl. ................................. 73/730; 73/119 A; 338/4
[58] Field of Search .................. 73/730, 119 A; 338/4

[56] References Cited

U.S. PATENT DOCUMENTS

| | | | |
|---|---|---|---|
| 3,603,152 | 9/1971 | Alibert et al. .......................... | 73/730 |
| 4,090,404 | 5/1978 | DuPont et al. ..................... | 73/119 A |

FOREIGN PATENT DOCUMENTS 2639164  3/1978  Fed. Rep. of Germany ........ 73/119 A

*Primary Examiner*—Donald O. Woodiel
*Attorney, Agent, or Firm*—Frishauf, Holtz, Goodman & Woodward

[57] ABSTRACT

A novel transducer useful in monitoring dynamic variations in the diameter of a fuel injector pipe is disclosed. A transducer body envelopes a portion of the diesel pipe by virtue of an elongate passageway therethrough. The body is secured to the pipe at either of its ends, and intermediate its ends, is characterized by a thin and planar transverse bridge section which lies in a plane parallel to the axis of the passageway. One or more strain detecting elements are mounted on the exterior of the bridge. The interior surface of the bridge may be spaced a finite distance from the pipe and bonded thereto by a bead of epoxy or the like. The transverse side of the bridge may also be separated from the remainder of the transducer body by means of two spaced apart holes or slots.

7 Claims, 2 Drawing Figures

DIESEL FUEL PIPE TRANSDUCER

BACKGROUND OF THE INVENTION

This invention relates to an improved transducer useful in monitoring dynamic variations in the diameter of a fuel injector pipe of a diesel engine.

Recently, serious attempts have been made to diagnose diesel engine performance, and specifically, injector performance, through the use of fuel injector pipe transducers which monitor the dynamic variations in the pipe. The readings or "signatures" so obtained on an oscilloscope or other suitable recording instrument can be analysed for the purpose of determining if a malfunction exists and in some instances, localizing the particular improperly functioning component. William S. Heggie in an article published by the American Society of Mechanical Engineers, paper No. 76-DGP-3 entitled "The Use of Plastic Cold Flow in the Development of an Externally Connected Transducer for Recording Pressure-time Histories of Diesel Fuel Injection Phenomena and its Application in Fault Diagnosis" discusses certain techniques and transducer devices currently in existence. Indeed, specific transducer construction for external mounting to a fuel line has been disclosed by Heggie in U.S. Pat. No. 3,937,087 issued Feb. 10, 1976 entitled "Transducer for Engine Fuel Injection Monitoring" and U.S. Pat. No. 4,027,536 issued June 7, 1977 under the same title.

In U.S. Pat. No. 3,937,087, the transducer therein disclosed embodies a torpedo-shaped housing having an internal cavity. The diesel pipe within the cavity is in contact with a strain detector mounted on its circumference and in turn is covered by a plastic sleeve. The cavity itself is then filled with epoxy or the like with electrical leads connected to the detector and which extend therethrough to the exterior of the torpedo housing. In his more recent U.S. patent, Heggie locates the strain detector or "pressure measuring" element within the epoxy filled cavity but away from the injector pipe at a position intermediate or proximate the cavity wall above the pipe. In the latter case, the strain detector is mounted on a rubber backing connected to the cavity wall.

In these known transducers as taught by Heggie, certain disadvantages are apparent. Firstly, during the assembly of the two-sectioned transducer on the injector pipe, and due to the use of an epoxy filled cavity, care must be taken in assembling same in order not to damage the strain gauge. Indeed, in this type of construction, foil type strain gauges are preferred since they are not as susceptible to damage or improper installation during assembly of the transducer as is the case with semiconductor strain gauges. The latter type of piezo-resistive gauges are preferred due to their high coefficient of resistance change (gauge factor) and therefore higher output. Accordingly, these known transducers are not conducive to field installation by unskilled technicians and more importantly, cannot readily be removed for reinstallation without anticipated damage to the strain gauge as the gauge or gauges are effectively bonded to the epoxy enveloping the pipe.

BRIEF SUMMARY OF INVENTION

The novel transducer of this invention, like those of Heggie as previously discussed, is intended to be externally connected to the injector pipe of a diesel engine. However, as the strain detecting element is not in direct contact with epoxy or the like and is mounted on an essentially flat surface, semiconductor strain gauges and other types of strain detecting elements such as piezo-electric crystals or bi-morphs can advantageously be employed without fear of damage. Moreover, the transducer may be field installed by relatively inexperienced personnel and also can be re-located for use on other injector pipes without damage to the strain gauge.

The novel transducer of this inventiion comprises an elongate transducer body which has an elongate passage therein for placement of the pipe therethrough. Means are provided proximate either end of said body for securely connecting the body to the pipe. A transverse bridge section forming a portion of the transducer body is located intermediate the ends of the body and lies in a plane parallel to the longitudinal axis of the passageway. On the exterior surface of the bridge remote from the passageway, any suitable strain detector element such as a foil strain gauge, piezo-resistive strain gauge or piezo-electric crystal or bi-morph may be mounted. Preferably, the interior surface of the bridge opposed the pipe is spaced a finite distance therefrom so that the interior or bottom of the bridge may be positively connected to the pipe by any suitable noncompressive adhesive means, such as, for example, epoxy. Optionally, and if desired, additional strain detecting elements may be located on the exterior of the bridge and where resistive elements are used, four can be interconnected to form a Wheatstone bridge circuit. The Wheatstone bridge configuration gives four times the output of a single gauge and importantly, is automatically thermally balanced which is superior to employing "dummy" gauges since even the thermal inertia effects at the gauges are similar. The full Wheatstone bridge will function on one side of the transducer bridge since both tensile and compressive regions occur simultaneously. Because the gauges are mounted on a metal bridge, heat sinking is better than where the gauges are located in epoxy thus allowing the application of a higher bridge excitation for the same self heating effect and thus greater output.

Because the thickness of the bridge is relatively small (being in the order of 0.02 inches) compared to the remainder of the transducer body, strain variations in the injector pipe will be better reflected at the bridge than in the remainder of the transducer body. Deflection of the bridge can be further enhanced particularly with a thicker bridge by effectively isolating the bridge on its transverse sides from the remainder of the transducer body. This may be achieved by means of two spaced-apart slots which better define the sides of the bridge. In this particular embodiment, it will be evident that strain or flexure experienced by the bridge, due to its relatively small mass will be greater than that experienced by the remainder of the transducer body and the slots effectively reduce the stiffness of the bridge which reduces the restraint imposed on the fuel pipe.

BRIEF DESCRIPTION OF DRAWINGS

In the accompanying drawings which illustrate a preferred embodiment of this invention.

DETAILED DESCRIPTION OF THE DRAWINGS

Figure 1:
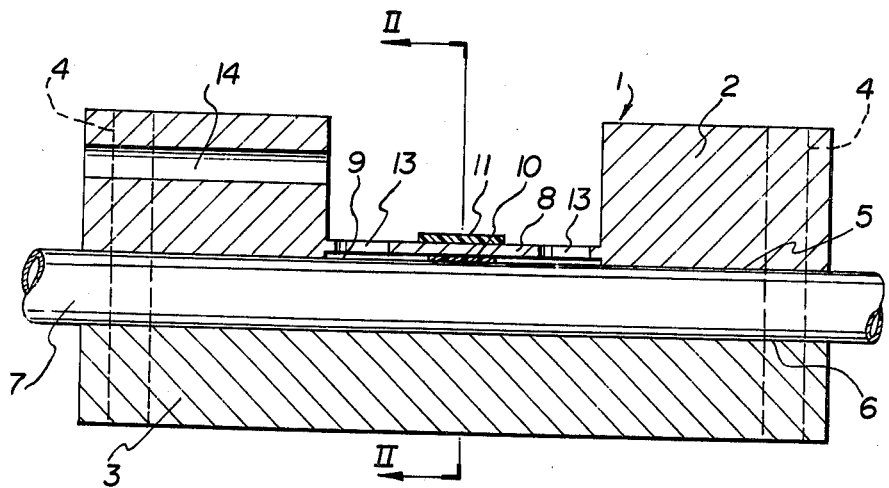
FIG. 1 is a longitudinal cross-section of the transducer with an injector pipe positioned therein and FIG. 2 is a transverse cross-section of the transducer taken along the lines of II–II of FIG. 1.

The transducer Body, generally indicated by reference numeral I, as illustrated, is constructed in two sections, namely upper section 2 and lower section 3. Holes 4 are provided at either end of body 1; the purpose of which is to allow securing bolts (not shown) to extend therethrough in order to clamp body 1 to injector pipe 7. An elongate passageway defined by channel 5 in upper section 2 and channel 6 in lower section 3 extends the length of the body 1 and is (with the exception of the bridge area as discussed below) of a size, in cross-section, corresponding to the outer diameter of pipe 7 in order to securely hold same when the two halves or sections 2 and 3 are bolted together. Although the passageway illustrated is circular in cross-section, (with the exception of cavity 9 seen in FIG. 2) it will be apparent that it can also be rectilinear. Further, it will be evident that the elongate passageway may, if desired, be formed by a deeper channel 5 in section 2 so that the pipe is held in position by a lower which is basically a flat plate (not shown).

Upper section 2 includes an intermediate thin and planar bridge section 8. This bridge section 8, as illustrated, lies in a plane parallel to the longitudinal axis of pipe 7 with its interior surface being spaced a finite distance from the exterior surface of pipe 7 so as to define gap 9 therebetween. As shown, where gap 9 exists, positive contact beteen bridge 8 and pipe 7 is obtained through the provision of a substantially non-compressive adhesive means 10, such as epoxy, connecting the interior surface of bridge 8 to the exterior of pipe 7. On the exterior or top of bridge 8 and above its adhesive connection with pipe 7, a strain detecting element 11 which may be one of a foil gauge, piezo-electric resistive gauge, or a piezo-electric bi-morph is provided. Electrical leads (not shown) connecting the strain detecting element 11 can advantageously extend through opening 14 of transducer 1 for the purpose of external connection. If the strain detecting element utilized is a piezo-electric crystal where the output is a function of compression, the crystal can advantageously be positioned on the bridge between the bridge and a further bracing plate (not shown) mounted on the top of section 2. That portion of section 2 above bridge 8 can also be filled with a potting material such as polyurethane, silicone rubber or a semiflexible epoxy so as to protect detector element 11 from damage or the elements.

In the embodiment illustrated, because bridge 8 is an integral part of upper section 2, the strain variations registered by bridge 8 can better be isolated from the remainder of the transducer body through the use of spaced-apart openings or slots 13 on either side of the bridge 8.

Figure 2:
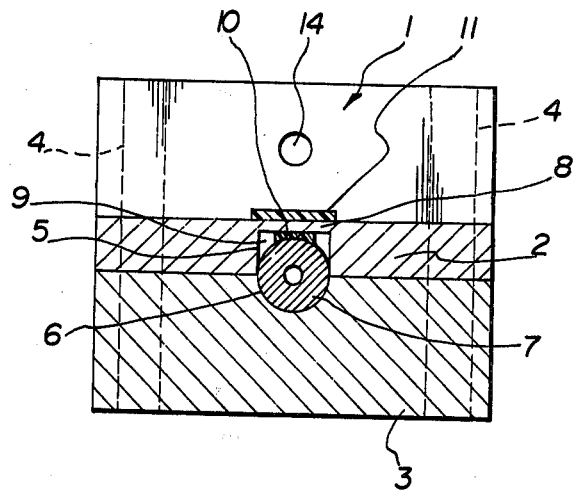

The body 1 may be constructed from mild steel or any other suitable material. It will also be observed that the adhesive connection between the interior surface of bridge 8 and pipe 7 need only involve the application of a thin bead of epoxy 10 or the like along the upper surface of pipe 7 or the internal or bottom central portion of bridge 8 prior to connecting upper section 2 and bottom section 3 together. Excess epoxy, upon clamping, can be taken up in cavity 9 of channel 5 without deleterious effect on bridge 8. In order to ensure pipe 7 is securely attached to the transducer in the proximity of detector 11, a further bead of epoxy or the like (not shown) can also be placed in the bottom of channel 6 opposed bead 10 or spread around the circumference of the pipe at this point (not shown). Indeed, by adhering the pipe to the channel 6 and wall 5, as best seen in FIG. 2, uniform radial deformation of pipe 7 is contained resulting in an eliptical form of deformation in a direction towards bridge 8 and the strain detecting element 11 associated therewith.

With the exception of cavity 9, pipe 7 is in positive contact with the walls of the passageway throughout its longitudinal extent. Although the bridge may be in positive contact with pipe 7, gap or space 9 is preferred in order to avoid unwanted displacement of bridge 8 from forces (such as mounting) other than those attributable to strain variations in the diameter of pipe 7. As mentioned previously, additional strain gauges (not shown) may be mounted on the external surface of bridge 8. Because the bridge experiences tensile and compressive forces simultaneously, four resistive type strain gauges can advantageously be used when connected in Wheatstone bridge fashion as is well known in the art.

The transducer of this invention is relatively simple to manufacture, is both rugged and simple in construction and is capable of being factory or field installed for the purpose of diagnostic performance determinations.

What I claim as my invention is:

1. A transducer for monitoring dynamic variations in the diameter of a fuel injector pipe of a diesel engine, said transducer comprising: an elongate transducer body adapted to envelope a portion of said pipe and including an elongate passageway therein for placement of the pipe therethrough, means at least promixate either end of said body for securely connecting the body to the pipe, said body further including a thin and planar transverse bridge section located intermediate the ends of said body and wherein said bridge lies in a plane parallel to the longitudinal axis of said passageway, and a strain detecting element mounted on the exterior surface of said bridge.

2. A transducer as claimed in claim 1, wherein the interior surface of said bridge is spaced a finite distance away from said pipe when said pipe is positioned in said passageway, and wherein said interior surface of said bridge is adapted to be secured to said pipe by substantially non-compressive adhesive means.

3. A transducer as claimed in claim 2, wherein said passageway is rectilinear or circular in cross-section.

4. A transducer as claimed in claim 2, wherein said strain detecting element is one of a foil strain gauge, a piezo-resistive strain gauge and a piezo-electric bi-morph gauge.

5. A transducer as claimed in claim 2, wherein the transverse sides of said bridge section are defined by two spaced-apart slots extending through said body.

6. A transducer as claimed in claim 2, comprising four resistive strain gauges on the exterior surface of the bridge, said gauges being electrically interconnected so as to form a Wheatstone bridge.

7. A transducer as claimed in claim 2, wherein said strain detecting element comprises a piezo-electric crystal and wherein said crystal is positioned intermediate said bridge and a bracing plate forming a portion of said body and, wherein said bracing plate is located above said bridge.

* * * * *